United States Patent [19]

Kobsa et al.

[11] Patent Number: 5,168,143
[45] Date of Patent: Dec. 1, 1992

[54] METHOD FOR LASER CUTTING METAL PLATES

[75] Inventors: Henry Kobsa, Greenville; Samuel E. Moore, Sr., Claymont, both of Del.

[73] Assignee: E. I. du Pont de Nemours and Company, Wilmington, Del.

[21] Appl. No.: 608,058

[22] Filed: Oct. 31, 1990

Related U.S. Application Data

[63] Continuation-in-part of Ser. No. 471,603, Jan. 29, 1990, abandoned.

[51] Int. Cl.⁵ ............................................. B23K 26/00
[52] U.S. Cl. ............................. 219/121.72; 219/121.84
[58] Field of Search ................ 219/121.67, 121.72, 219/121.84

[56] References Cited

U.S. PATENT DOCUMENTS

| Re. 31,042 | 9/1982 | Clark et al. | 219/121 LG |
|---|---|---|---|
| 3,742,182 | 6/1973 | Saunders | 219/121 LM |
| 3,750,049 | 7/1973 | Dowley et al. | 331/945 |
| 3,942,878 | 3/1976 | Engel et al. | 350/274 |
| 4,002,877 | 1/1977 | Banas | 219/121.72 |
| 4,010,345 | 3/1977 | Banas et al. | 219/121.67 X |
| 4,031,351 | 6/1977 | Martin | 219/121.84 X |
| 4,032,743 | 6/1977 | Erbach et al. | 219/121 LM |
| 4,190,759 | 2/1980 | Hongo et al. | 219/121 LM |
| 4,680,442 | 7/1987 | Bauer et al. | 219/121.84 X |
| 4,795,560 | 1/1989 | Chupka et al. | 210/497.01 |
| 4,871,897 | 10/1989 | Nielsen | 219/121.84 X |

FOREIGN PATENT DOCUMENTS 2118884 10/1985 United Kingdom.

*Primary Examiner*—C. L. Albritton

[57] ABSTRACT

A laser cutting method for complex capillaries wherein a multi-mode beam from a solid-state is reduced to predominantly a single mode and focused to a spot about 40 microns in diameter. The laser is focused about 0.2 to 0.3 mm above the work piece. The predominantly single mode is a TEMoo mode. By recutting the capillary slots with the laser, metal oxide particles condensed from the vapor phase and resolidified molten metal on the walls of the slots are removed.

7 Claims, 2 Drawing Sheets

METHOD FOR LASER CUTTING METAL PLATES

BACKGROUND OF THE INVENTION

This application is a continuation-in-part of application Ser. No. 07/471,603 filed Jan. 29, 1990 now abandoned.

This invention relates to a method for cutting metal plates and, more particularly, it relates to cutting orifices in spinneret plates with a laser beam.

Spinnerets are usually round or rectangular metal plates typically 10 to 20 mm thick. Lead holes are drilled from the back to within several hundred microns of the spinneret face. The spinneret capillaries themselves are then formed by one of several methods.

Spinneret capillaries used for solution spinning and for melt spinning round fibers are always drilled using spade drills. The most common method used for making spinneret orifices for melt spinning non-round or void containing fibers is Electric Discharge Machining or EDM. Two methods are in use. In one, an electrode is fabricated which has the exact shape of the desired capillaries. The spinneret and the electrode are immersed in a non-conducting oil and a strong current is passed between them which erodes the metal so that an orifice of the desired shape is formed. In the other, a round hole is drilled; a wire is threaded through the hole; the spinneret is submerged in deionized water; and a strong current is passed between the wire and the spinneret. The wire is then used like a jig saw to cut out an orifice of the desired shape. It should be noted that were this method used to make the spinneret of FIG. 2, four holes would have to be drilled and the wire would have to be broken and re-threaded four times. Spinneret capillaries made with either of the EDM methods of necessity have straight sides.

Another method known to Applicants is punching the orifices. In this method a first punch with sides tapered with typically an included angle of 50 degrees is used to punch an entrance channel to within typically about 100 microns of the spinneret face. After lapping the face of the spinneret to remove the metal bulges produced in the first step, a second punch having the exact shape of the desired capillary is then used to form the spinning capillary. A final lapping step completes the process.

Although the second punch which forms the spinning capillary could, in principle, be given any desired shape, all punches made so far have had straight sides; therefore, the capillaries punched with them have parallel walls. Making the punches for a spinneret capillary such as the one shown in FIG. 2 is a very difficult task which can only be performed by very skilled mechanics after years of training. Therefore, applicant has never attempted to make more complicated punches such as ones with tapered sides. The punching method is faster and cheaper than either of the EDM methods. However, it suffers from a major limitation: The ratio of the length of the capillary to the width at the narrowest point, hereinafter referred to as L/D, is limited by the strength of the punch to values somewhat less than 2. Typically, the length of the capillary will be of the order of 100 microns and the width of the slots will be of the order of 60-80 microns, so L/D will be about 1.2 to 1.7.

In melt spinning of fibers such as nylon, polyester, or polypropylene, one desires capillaries with high L/D primarily for two reasons: mechanical soundness of the spinneret; and polymer metering. However at very high L/D, pressure drop becomes a problem since polymer leaks from the spinning pack become more frequent as the pressure drop increases. A third advantage for high L/D comes into play with post coalescing spinnerets such as the one shown in FIG. 2. At low L/D, the webs between the slots are weak and are often ripped out when the spinneret is removed from the spinning machine and the polymer cools and contracts. This imposes a minimum width on the web; but for good post coalescence, one would like to decrease the web width. Obviously, if the web thickness is increased, the web width can be decreased without jeopadizing mechanical soundness.

The ideal spinneret would have complete capillary-to-capillary uniformity. Each capillary would have a length to width ratio of at least 2 or more for adequate mechanical soundness and accurate polymer metering. The holes would be as small as practical to impart a high velocity, hereinafter referred to as the jet velocity, to the emerging polymer stream. A high jet velocity is desired to minimize the spin stretch, the ratio of the feed wheel velocity to the jet velocity and it is essential for good post coalescence. Excessive spin stretch results in denier non-uniformities and can result in spinning discontinuities. Further, the spinneret would operate at low pressures (e.g., at less than 14,000 kPa) to reduce pack leaks and pumping requirements. Unfortunately, the commonly used EDM methods are very slow and expensive whereas the punching method is limited to L/D values less than 2. Furthermore, the requirement for good metering (small, straight-sided holes with long length-to-width dimensions) conflicts with low pressure operation.

Cutting complicated spinneret orifices with lasers has been considered because of the potential advantages:

(1) Any material could be used; not just metals, but also ceramics; anything that one would like to use for durability, corrosion resistance, etc.

(2) Laser cutting is potentially fast and inexpensive. No special tools have to be made such as in punching or EDM. Cutting speed is, in general, not limited by the laser, but only by the ability to move the workpiece (spinneret) around fast enough. One can readily switch from one capillary design to another by software changes to the computer-controller.

(3) There is no significant restriction on L/D. However, until now, laser cutting of spinneret orifices has failed.

There are five key obstacles one must overcome to make acceptable slots for spinneret orifices:

(1) The slots must be narrower (~60 microns) than can be provided by conventional lasers (100-300 microns).

(2) The slots must have straight sides or preferably taper from the back towards the face of the spinneret with an included angle of up to about 20 degrees. Since spinning capillaries typically have long lead holes, it is impossible to cut from the back of the spinneret. Therefore, one must cut from the front of the spinneret. This means that the laser must cut a slot with parallel walls or, preferably, slightly divergent walls. This is not what is usually obtained. Prior art laser cutting techniques generally produce cuts which become narrower rather than broader towards the back side of the piece being machined.

(3) The slots must be accurate and fully reproducible within a tolerance of about ±1 micron. This is very difficult to do with a solid state laser. Clean cutting of metals requires an energy density of at least about 40 MW/cm2. If the beam diameter is 40 microns, over 500 W of laser energy would be required if the laser were operating in CW mode. While solid state lasers of this power are available, their beam quality is much too poor to be focused to a 40 micron spot. Moreover, to avoid overheating the work piece, cutting speed would have to be about 2 m/min. This is quite impossible since equipment does not exist which can move a spinneret which may weigh as much as 10 kg at such a speed through the intricate patterns required to form complex spinneret capillaries. In particular, one must be able to stop within about 1 micron. Even with the best available commercial positioning stages, cutting speeds cannot be much higher than 0.05 m/min if spinneret design tolerances are to be met. The laser must be operated in a pulsed mode with a low duty cycle of, at most, a few percent. However, pulsed operation of a solid state laser creates another problem: pointing instability which is a beam which wanders from side to side and produces a wavy cut which is unacceptable for a spinneret orifice. This is caused by uneven heating of the laser crystal by the flash lamps. The heating is never perfectly uniform, even though laser manufacturers take great pains to minimize this problem, and so the crystal distorts during each flash.

(4) Another problem is thermal lensing which results from radial temperature gradients within the laser rod. The laser rod is hottest at its center and heat flows radially from the center to the surface. As a result there is also a radial refractive index gradient. Consequently, the laser rod acts like a lens and rays propagating in the laser crystal at different distances from the center focus at different points. Thermal lensing limits the size of the smallest spot to which the beam can be focussed.

(5) A problem which is not normally seen with wider cuts is related to the fact that the metals comprising the spinneret are oxidized during the cutting (for efficient metal removal cutting must be performed in an oxidizing atmosphere, e.g., 4 Bar of pure oxygen). The metal oxide vapors condense behind the advancing laser beam and form small particles which stick to the molten metal along the sides of the cuts and, at times, actually bridge the gap between the sides of the cut. Unfortunately, this problem cannot be corrected by some sort of mechanical clean-up, since broaches with an L/D of 10 or more and a diameter of, e.g., 60 microns, have insufficient shear strength and break without removing the oxide particles.

SUMMARY OF THE INVENTION

According to the invention, a method for cutting complex capillaries in spinneret plates including the steps of directing a pulsed multi-mode laser beam toward the face of the spinneret plate to create a molten pool of metal between the face and the bottom of the counterbore of the plate and expelling the molten metal from the bottom of the counterbore by means of a presurized fluid flowing coaxially with said beam is improved by (1) reducing the pulsed multi-mode laser beam to substantially a single-mode beam by installing two appertures inside the laser cavity and by judicious choice of all the operating parameters of the laser, (2) focussing the beam to a spot size of about 35 to 40 microns by a system of lenses which increases the beam diameter about 5× before focusing it thus decreasing spot size at the expense of increasing divergence, (3) using oxygen under 4 Bar pressure as a cutting assist gas, and (4) focusing the beam above the upper surface of the plate. Preferably the beam is in substantially a $TEM_{oo}$ mode with a pulse length less than 200 microseconds and the pulsed beam has a frequency in the range of from about 100 Hz to about 200 Hz. The capillaries are systems of slots or other non-round shapes and are formed by moving the plate relative to the beam so that the beam traces the outline of the desired shape in at least two passes.

DETAILED DESCRIPTION OF THE PREFERRED EMBODIMENT

Figure 1:
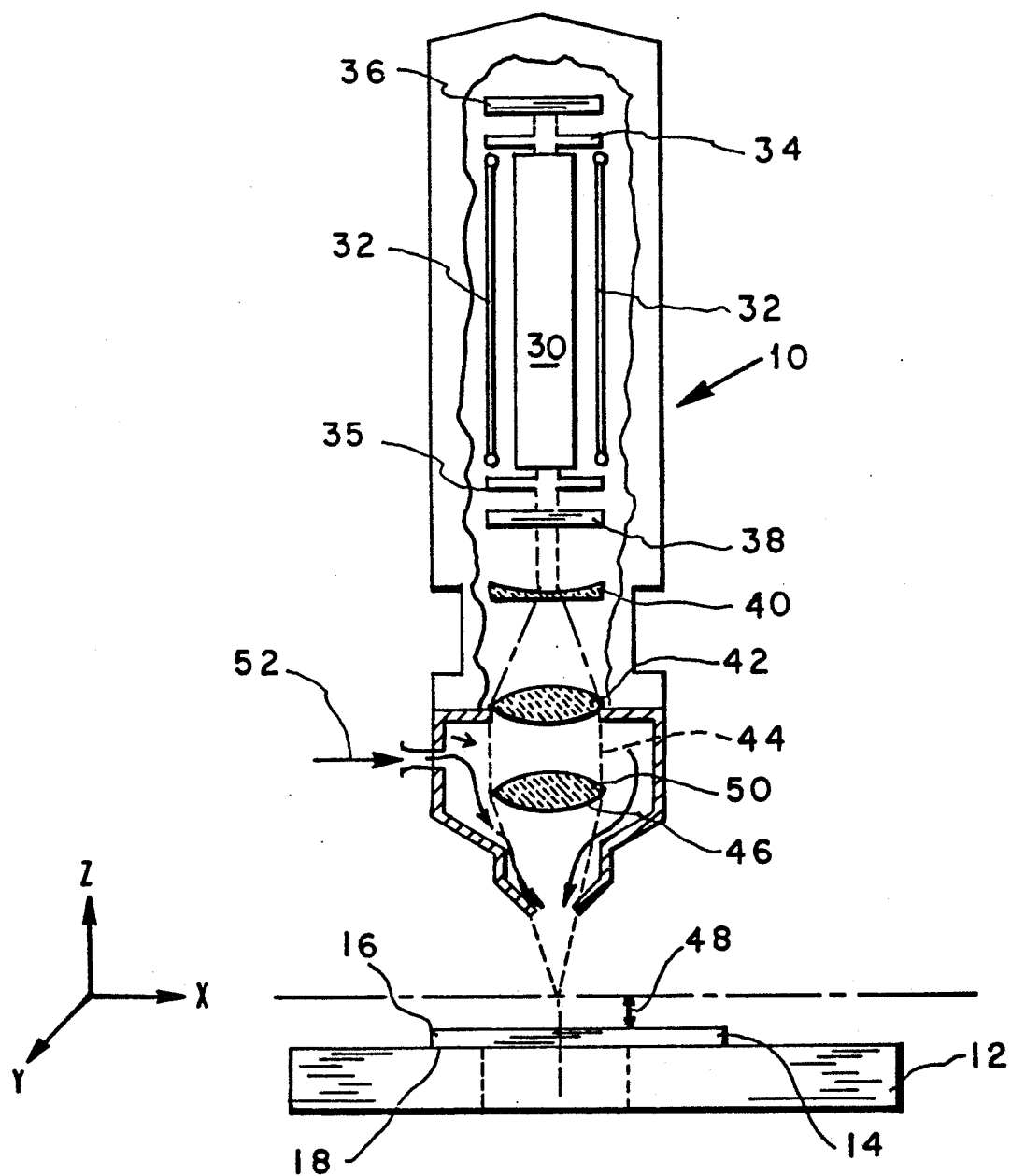
FIG. 1 is a schematic representation of an apparatus useful in practicing the method of this invention.
Figure 2:
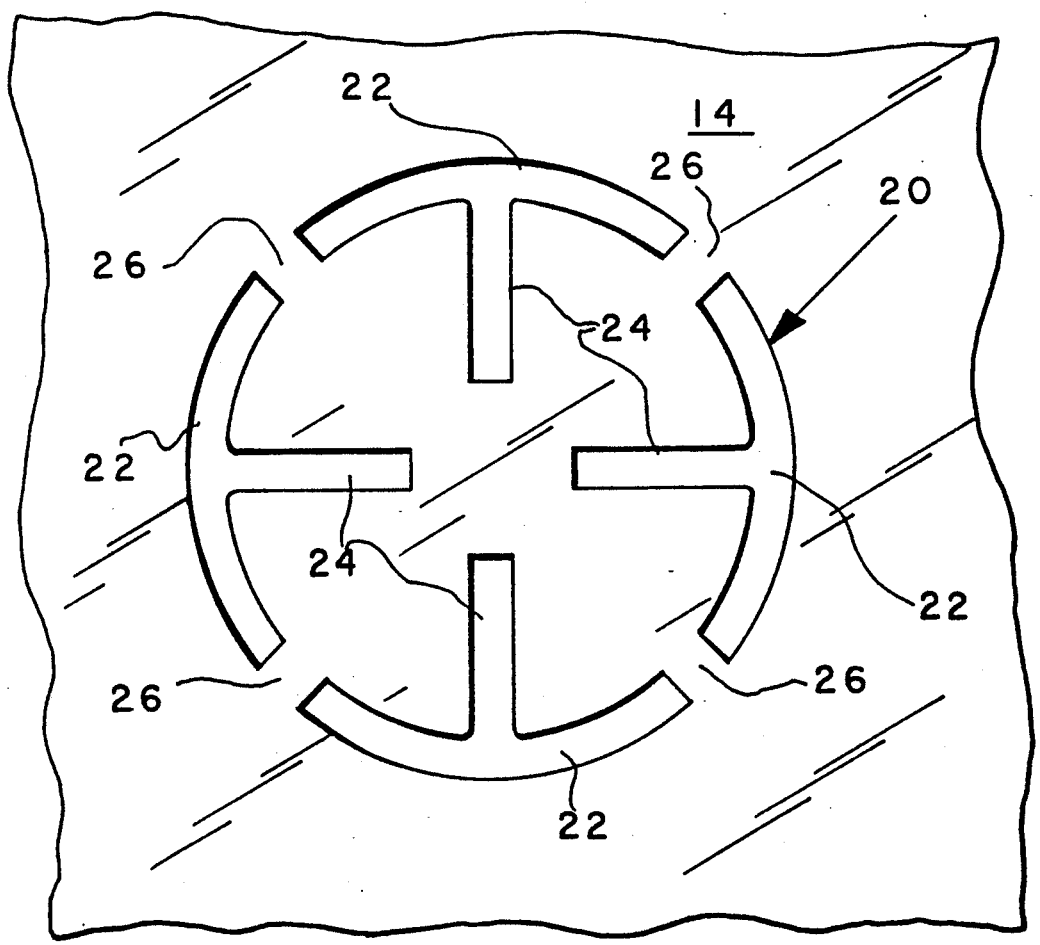
FIG. 2 is a plan view of a complex spinneret capillary made using the method of this invention.

FIG. 1 illustrates the preferred apparatus for practicing the invention and generally includes a pulsed multimode laser energy source 10, mounted for movement in the X, Y and Z planes (represented by direction arrows) relative to Table 12 carrying a spinneret plate 14 which has an upper surface (face) 16 and a lower surface (back side) 18. The spinneret plate when formed will contain a plurality of complex shaped capillaries 20. The capillary 20 is known as a slot-type capillary which in this case (FIG. 2) comprises four peripheral slot-type openings 22 surrounding an inner minute area. Extending radially inward short of a common intersection are four straight slot-type openings 24 joining the peripheral opening 22 at their centers. Air vents 26 separate peripheral slots 22.

The pulsed-multi mode energy source is a solid state laser such as a neodium-yttrium aluminum garnet (Nd-YAG) rod 30 optically pumped by one or more of xenon (max. 700 V) flash tubes 32. A preferred Nd-YAG laser is a model LAY50-2 from Haas-Laser GmbH, Schramberg, West Germany. Typically the Nd-YAG laser allows many modes to run simultaneously which results in somewhat poor beam quality. To remedy this, two 3.2 mm appertured discs 34, 35 are inserted inside the laser cavity between the back and front mirrors 36, 38, respectively.

By inserting two 3.2 mm diameter apertures between the crystal and the two mirrors, the number of modes was reduced. Further improvements in beam quality to substantially a predominantly $TEM_{oo}$ mode were achieved by operating the laser at very low power levels, typically no more than about 10 percent of its rated power, by reducing the voltage applied to the flash tubes from about 700 volts to about 500 volts.

Nd YAG lasers normally have a very low divergence, so it was possible to trade some increased divergence for decreased focal radius since the product of the two is sensibly constant for a given laser and operating conditions. This was done in the following way. A planarconcave lens 40 with a focal length of −20 mm was placed on the optical axis outside the outcoupling mirror 38. A biconvex lens 42 with a focal length of +100 mm was placed confocally with the planarconcave lens 40 on the optical axis. This produced a collimated beam 44 with a diameter of 16 mm. A second biconvex lens also having a focal length of +100 mm focused the beam to a spot with a diameter of about 35 to 40 microns. The larger beam diameter before focussing increases divergence about 5× and decreases beam diameter also by about 5×. The resulting divergence of about 80 mrad is a desirable feature since it permits cutting parallel to slightly divergent slots rather than the usual convergent slots provided the beam is focused in the proper plane.

In the pulsed operation, the pulses should be as short as possible, but a Nd YAG laser needs some minimum time to build up a laser discharge. We exhaustively explored all possible combinations of pulse duration, frequency, and lamp voltage and found that, with the laser we had, it was not practical to use lamp pulses much shorter than 200 microns.

In operation, 130 Hz was found to be a good repetition (rep) rate for the instant purposes. For smooth cutting, the rep rate should be reasonably high. At 50 mm's cutting speed and a rep rate of 130 Hz, the work piece moves approximately 6 microns between pulses. It should not move much further than that. On the other hand, at rep rates much above 130 Hz, laser power dropped off and the laser would not run at more than 185 Hz at 500 V lamp voltage and a lamp pulse duration of 200 microns. Higher rep rates could be obtained with shorter lamp pulses; for example, with 175 microns lamp pulses, frequencies of about 150-160 Hz at some loss in average power could be obtained. At 500 V lamp voltage and with a pulse duration of 200 microns, the laser pulse is 125 microns long for a duty cycle of 1.6% at 130 Hz.

It was found that the quality of the cuts improved continuously as the voltage of lamps 32 was decreased in small steps to 485 V. However, much below 485 V the laser could no longer punch through the metal to start a new cut. The laser was then operating at 11 W or 85 mJ/pulse. 70% of the beam energy fell into a circle of 32 microns diameter and 90% fell into a circle of 42 microns. A key requirement is to deliver short, tightly focussed pulses of about 40 MW/cm$^2$ with a low enough duty cycle to avoid overheating the workpiece at the necessarily low cutting speeds. The optimal operating conditions will vary somewhat with the chemical composition and thickness of the metal being cut. Metal removal is a key issue in metal cutting. Cutting nozzles are commonly employed. The mechanical strength of the focusing lens 50 limits gas pressure to about 5 Bar, although some laboratories have achieved 10 Bar and more by special designs. A gas supply 52 at 5 Bar was used which means that when the nozzle was cutting the actual pressure was about 4 Bar. Of several cutting gases tried, pure oxygen worked best. The distance between the cutting nozzle and the workpiece was critical (100+10 microns over a distance of about 400 mm).

There is at least one more key requirement: the beam 44 must be focused not on the plate 14, but rather some distance 48 (about 0.2 mm) above the upper surface 16 of the plate. This is accomplished through focusing lens 50. This causes the narrowest part of the slot being cut to be at very slightly below the surface and for the slot to have either parallel walls or walls which diverge a few degrees which is the most preferred case.

We claim:

1. In a method for cutting through a metal plate having upper and lower surfaces that includes the steps of directing a pulsed multi-mode laser energy source beam toward the upper surface of said plate to create a molten pool of metal between the upper and lower surfaces of the plate and expelling the molten metal from the lower surface by means of a pressurized fluid flowing coaxial with said beam, the improvement comprising: reducing the multi-mode laser beam to substantially a single-mode beam; and focussing said single-mode beam to a spot size of less than 100 microns on a location above the upper surface of said plate.

2. The method of claim 1, said single-mode beam being in a TEMoo mode.

3. The method of claim 1, wherein the pulse length of said beam is less than about 200 micro-seconds.

4. The method of claim 3, wherein the pulsed beam has a frequency from about 100 Hz to about 200 Hz.

5. The method of claim 1, wherein said pressurized fluid is oxygen.

6. The method of claim 1, wherein spinneret capillaries defined by slots are cut in said plate by moving said plate in at least one pass relative to the beam in a path defined by said slot.

7. The method of claim 6, wherein said plate is moved in at least two passes.

* * * * *